(12) United States Patent
Harneit

(10) Patent No.: US 6,347,577 B1
(45) Date of Patent: Feb. 19, 2002

(54) ROTISSERIE BASKET FOR GRILLS

(76) Inventor: Uwe Harneit, 1466 W. Francis Ave., Ontario, CA (US) 91762-6016

( * ) Notice: Subject to any disclaimer, the term of this patent is extended or adjusted under 35 U.S.C. 154(b) by 0 days.

(21) Appl. No.: 09/895,727

(22) Filed: Jul. 2, 2001

(51) Int. Cl.[7] .......................... A47J 37/00; A47J 37/04; A47J 37/07; A47J 43/18
(52) U.S. Cl. ........................ 99/427; 99/419; 99/421 H; 99/449; 99/443 R
(58) Field of Search .................... 99/331, 339, 340, 99/419–421 V, 444–450, 481, 482, 443 R, 443 C; 211/181.1; 126/9 R, 25 R, 41 R

(56) References Cited

U.S. PATENT DOCUMENTS

| | | | |
|---|---|---|---|
| 2,762,293 A | * 9/1956 | Boyajian ................... 99/421 P |
| 2,938,450 A | 5/1960 | Carpenter et al. |
| 3,126,814 A | * 3/1964 | Norton ...................... 99/421 H |
| 3,563,159 A | 2/1971 | Johnson |
| 3,901,136 A | * 8/1975 | Wilson et al. .................. 99/446 |
| 3,951,052 A | 4/1976 | Ringo ........................... 99/427 |
| 4,470,343 A | * 9/1984 | Didier ........................... 99/448 |
| 4,483,241 A | * 11/1984 | Waltman ........................ 99/449 |
| 4,549,476 A | * 10/1985 | Langen ........................ 99/450 |
| 4,555,986 A | 12/1985 | Eisenberg |
| 4,593,613 A | 6/1986 | Waltman |
| 4,688,477 A | * 8/1987 | Waltman ...................... 99/449 |
| 4,723,482 A | * 2/1988 | Weiss et al. ................... 99/427 |
| 4,787,302 A | * 11/1988 | Waltman et al. .............. 99/427 |
| 5,134,927 A | * 8/1992 | McCarthy, III et al. ........ 99/446 |
| 5,184,540 A | * 2/1993 | Riccio ...................... 99/421 H |
| 5,325,767 A | 7/1994 | Beller |
| 5,339,726 A | 8/1994 | Poulson |
| 5,431,093 A | * 7/1995 | Dodgen ........................ 99/427 |
| 5,562,022 A | 10/1996 | Schmid et al. |

* cited by examiner

*Primary Examiner*—Timothy F. Simone
(74) *Attorney, Agent, or Firm*—Lewis M. Brande; Thomas A. McCleary; Brande & McCleary

(57) ABSTRACT

A rotisserie basket for cooking whole chickens, roasts, etc. without the need to pierce the food with a spit or rod as in other, conventional rotisserie baskets. The rotisserie basket consists of a pair of end plates secured in a parallel relationship by a set of parallel rods. A gate is hingeably attached to a hinge rod, and when closed, bears against a latch rod. The gate is secured into position by a latch that positions the latch rod in a "U" shaped portion of a centrally located rod. A leaf spring holds the food to be cooked onto the set of rods, securely positioning the food for cooking.

6 Claims, 5 Drawing Sheets

ROTISSERIE BASKET FOR GRILLS

BACKGROUND OF THE INVENTION

1. Field of the Invention

Many ovens or barbecues are equipped with a device for the grilling or browning roasts, chicken and other small fowl. These devices are commonly called rotisseries.

These rotisseries are normally composed of a 4-sided spit or rod. One end of the spit has a handle, while on the opposing end is pointed and is sized to fit into a grill motor. The most common method of supporting the spit, while in use, is by fabricating notches in opposing sides of the barbecue.

In conventional ovens, such as those used inside the home, a grill motor is permanently installed into one wall of the oven. The opposing wall has an indentation molded or formed into the opposing wall, which allows the spit to freely rotate. The grill motor slowly rotates the spit, assuring that the food is even browned.

The current arrangements on the spits today consist of two opposing spike assemblies where each spike assembly consists of at least two (and sometimes more) spikes attached to a sleeve. The sleeve has a hole in the shape of the spit, which will allow the spike assembly to be easily slid along the spit. This allows for easy positioning of the spike assembly. The spike assembly can be temporarily fixed in place by a thumb screw, which will friction-lock the spike assembly to the desired position. The chef will slide one of these sets of spikes on the spit before the meat is cooked.

The meat is then slid onto the spit, until it is speared by the spikes of one spike assembly. The opposing spike assembly is slid onto the spit, so that the two sets of opposing spikes will hold the meat in place on the spit. The grill motor rotates the rod, which rotates the spit.

Cooking fowl poses certain inherent difficulties, since most chefs will spear the fowl through the wings or thighs in order to prevent the fowl from hanging down too close to the heat source. This causes the fowl to cook unevenly, thus burning portions of the fowl before the rest of the fowl is cooked.

2. Description of the Prior Art

Rotisserie baskets are well known in the prior art.

U.S. Pat. No. 4,688,477 by John Waltman discloses a Clamping Member for a Rotisserie. This invention describes a pair of end plates being separated by a plurality of circumferentially spaced rods which are secured to the end plates. One pair of rods are adjacent and opposed from each other and provide an opening for food to be placed in the interior of the cradle. A series of clamping members are disposed on the pair of adjacent rods and secure the food in the cradle.

This invention differs from the present invention in that the food is clamped by rods by spearing the food with prongs attached to the L-shaped rods. The food clamps are held in position by adjustable screws. The present invention does not use any prongs that penetrate the food but rather uses clamping pressure to secure the food within the basket.

U.S. Pat. No. 5,562,022 by Schmid discloses an Oven System. The patent describes an device that has rotating disks. The disks have rack frames rotatably mounted between the rotating disks which allows foods to be placed within the frames and to be evenly cooked.

U.S. Pat. No. 5,325,767 by Beller discloses a Spit Basket. This invention discloses a series of prongs attached to an upper and a lower basket housing. A spit is inserted through the food to be cooked. Upper and lower basket housings are slid on rod assemblies to the desired positions, and then secured by nut elements. The prongs penetrate through the carcass and hold it in position, preventing shredding of the meat when rotated.

U.S. Pat. No. 4,555,986 by Eisenberg discloses a Cage Rotisserie. This invention discloses a rotating cylindrical cage that has two baskets located inside. One basket is smaller than the opposing basket allowing it to fit inside the opposing basket while securing the food to be cooked. One of the objects of this invention is to receive food without piercing the food, as in other rotisseries.

U.S. Pat. No. 2,938,450 by Carpenter discloses an Outdoor Cooking Apparatus. The patent discloses sectional drum arrangements that are detachably connected to each other and would hold the food within the drum, when assembled. A spit would penetrate through the end plates of the drum both to support the drum on its mounts, and to support the food within the drum. The spit would be long enough to be rotatably mounted onto a pair of A-Frames.

U.S. Pat. No. 3,563,159 discloses a Rotisserie. The rotisserie of this invention consists of a drum, which is large enough for roasts and the like, and uses a spit arrangement to secure the meat for cooking. The rotisserie also has a double drum arrangement which secures smaller foodstuffs such as vegetables on the outer surface which is between the inner drum and an outer drum for even cooking. Access to the inner and outer drum is by access doors mounted onto the cylinders.

U.S. Pat. No. 4,593,613 by Waltman discloses a Rotisserie. The Waltman patent discloses a number of embodiments. One embodiment has a basket that is able to be vertically positioned above the heat source. The cradle has opposing end plates that have longitudinal rods that support the meat to be cooked. The cradle also has clamping members to support the food when the cradle is rotated.

A second embodiment of the Waltman patent discloses a cradle that has end-plates that have radially disposed slots. When one end plate is rotated (control plate), the radial and angular position of the longitudinal rods with respect to the longitudinal axis is varied, clamping the food for cooking.

A third embodiment of the Waltman patent is an extension of the aforementioned second embodiment. U-shaped members are pivotally secured to opposing longitudinal rods to open and close the opening to the cradle.

SUMMARY OF THE INVENTION

The purpose of the present invention is to create a rotisserie basket that is capable of browning meat, such as roasts, chickens and other small fowl, evenly without burning portions of the meat.

The object of the invention is to create a rotisserie which will not require the meat or small fowl to be speared by spikes or a spit. Then the small fowl could be evenly heated during the cooking process without burning the portion of the food closest to the grill.

Another object of the invention is to create a rotisserie that is capable of even cooking of the food without piercing the food, which allows the liquid, or drippings from the food to remain inside, preventing flare-up from the food's drippings being ignited by the cooking flame, and also prevents the food from drying out because the drippings escape the food.

This problem was solved by designing a drum shaped basket. The drum shaped basket has a center axle which does not penetrate the center of the basket, but instead is attached to opposing end walls of the basket. One end of the center axle has a handle mounted on it and is longer than the opposing end of the center axle, which will interface with a grill motor.

The meat or fowl will be held in the drum shaped basket by at least one leaf spring, which will keep the fowl centered within the basket, thus ensuring even heating and cooking of the food.

DETAILED DESCRIPTION

Figure 1:
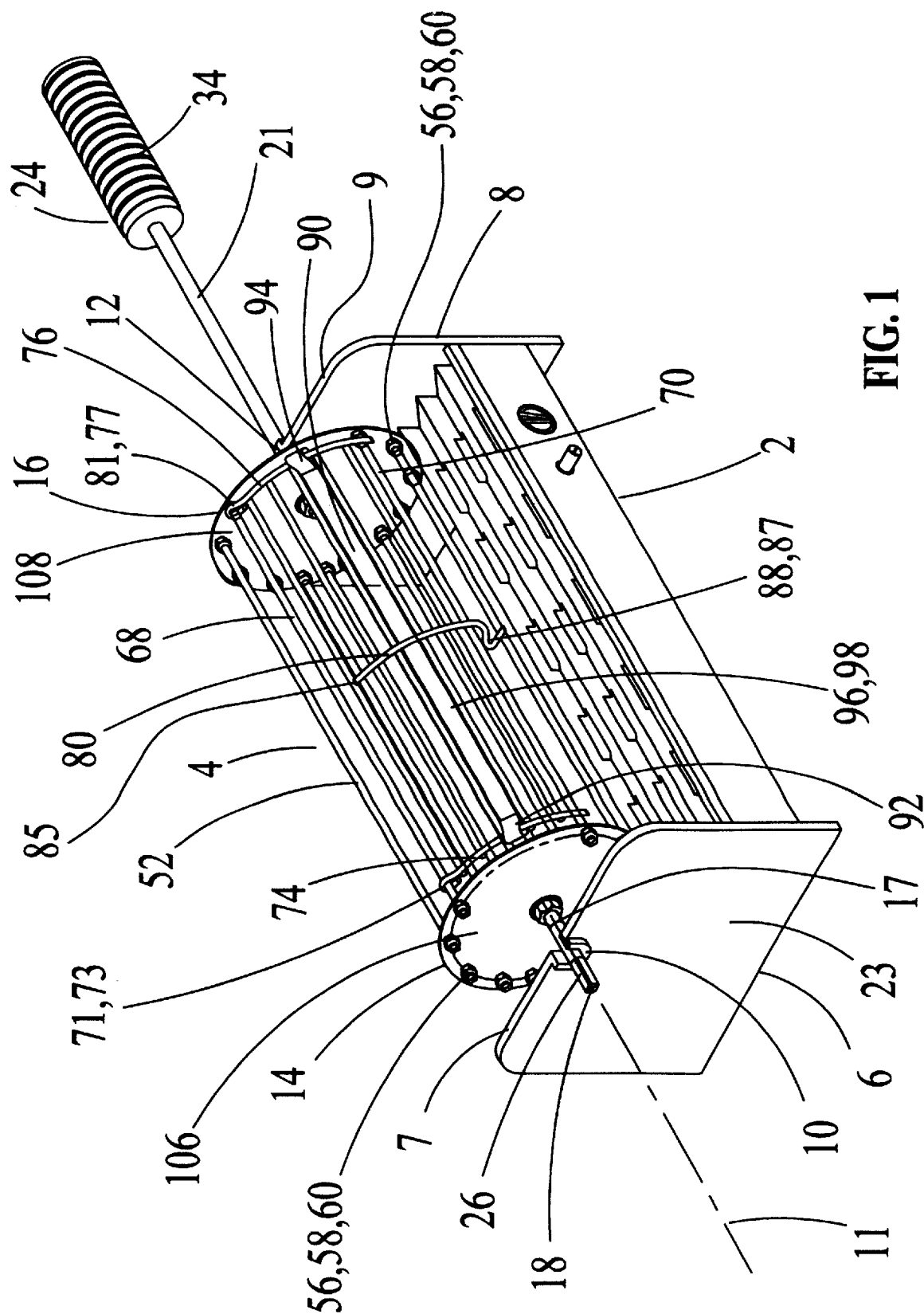
FIG. 1 shows a perspective view of the rotisserie basket mounted in an oven or grill.

With respect to FIG. 1, we show a portable grill (2) the portable grill having a first end plate (6) and a second end plate (8). The first end plate (6), has a top surface (7), where the top surface (7) of the first end plate (6) has a first oblong shaped positioning slot (10) defined therein. The second end plate (8) has a top surface (9), where the top surface (9) of the second end plate (8) has a second oblong shaped positioning slot (12) defined therein. The first oblong shaped positioning slot (10), and the second oblong shaped positioning slot (12) defines a longitudinal axis (11) which provides for good central positioning of a rotisserie basket (4).

The rotisserie basket (4) has a first end plate (14) and a second end plate (16). The first end plate (14) has a first side (106) and an opposing second side (110). The second end plate (16) has a third side (108) and an opposing fourth side (112). The first end plate (14) and the second end plate (16) each has an opposing set of circumferentially positioned holes (62,64). The opposing set of circumferentially positioned holes (62,64) are adapted to each receive one of a first plurality of longitudinal rods (52), where each of the first plurality of longitudinal rods (52) has a first threaded end (54) and a second threaded end (56). The first plurality of longitudinal rods (52) are disposed in a parallel relationship to each other.

Figure 4:
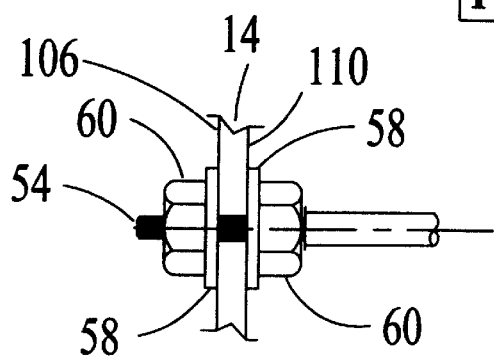
FIG. 4 shows an alternative method of attaching the plurality of rods to the end plates.
Figure 4:
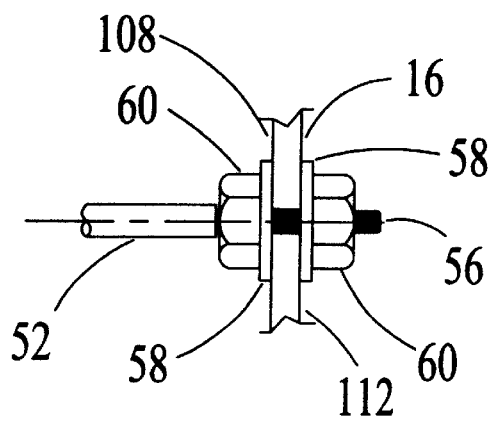

FIG. 4 shows one embodiment for attaching the plurality of threaded rods (52) to the first end plate (14) and the second end plate (16). The first threaded end (54) has a washer (58), the washer (58) bearing against the second side (110) of the first end plate (14). The first threaded end (54) has an additional washer (58), which bears against the first side (106) of the first end plate (14). A pair of locking nuts (60) are positioned on either side of each washer (58), and are threadably engaged onto the first threaded end (54). When the locking nuts (60) are tightened, they force the washers (58) to bear hard against the first end plate (14) firmly locking it in position as is accomplished in a double nut configuration well known in the art. The second threaded end (56) has a washer (58), the washer (58) bearing against the third side (108) of the second end plate (16). The second threaded end (56) has an additional washer (58) which bears against the fourth side (112) of the second end plate (16). A pair of locking nuts (60) are positioned on either side of each washer (58), and are threadably engaged onto the second threaded end (56). When the locking nuts (60) are tightened, they force the washers (58) to bear hard against the second end plate (16) firmly locking it in position as is accomplished in a double nut configuration well known in the art. The first plurality of longitudinal rods (52) are of a length sufficient to space the first end plate (14) and the second end plate (16) apart creating a holding cavity (100) therebetween, wherein the holding cavity (100) is of sufficient volume to securely contain the food to be cooked. The spacing of the opposing set of circumferentially positioned holes (62,64) and hence the first plurality of longitudinal rods (52) is small enough to prevent pieces of food positioned within the rotisserie basket (4) from falling therethrough. A hinge rod (68) and a latch rod (70) are positioned opposing each other and are attached to the first end plate (14) and the second end plate (16) in a parallel relationship to each other and to the first plurality of longitudinal rods (52). The hinge rod (68) and the latch rod (70) are circumferentially spaced providing a longitudinal opening sufficient to allow food to be easily deposited into the holding cavity (100) thereby defined.

A gate (66) of the rotisserie basket (4) has a second plurality of longitudinal rods (78). A first end rod (74) and a second end rod (76) are perpendicularly disposed to a common longitudinal axis (47) of the rotisserie basket (4), and are opposing each other, while the second plurality of longitudinal rods (78). The second plurality of longitudinal rods (78) are disposed in a parallel arrangement to the common longitudinal axis (47) of the rotisserie basket (4) and are attached onto the first end rod (74) and the second end rod (76). The first end rod (74) has a first end (73) and a second end (75). The first end (73) of the first end rod (74) has a first loop shaped portion (71) wherein the first loop shaped portion (71) hingeably pivots about the hinge rod (68) located on the rotisserie basket (4). The second end rod (76) has a first end (77) and a second end (79). The first end (77) of the second end rod (76) has a second loop shaped portion (81) similar to the first end rod (74) wherein the second loop shaped portion (81) hingeably pivots about the hinge rod (68) located on the rotisserie basket (4). The first and second loop shaped portions (71,81) of the first end rod (74) and the second end rod (76) are curved so as to prevent the gate (66) from being easily disconnected or removed from the rotisserie basket (4). The second end (75) of the first end rod (74) and the second end (79) of the second end rod (76), each bear against the latch rod (70) when the gate (66) is closed, creating a smooth closed basket. The first end rod (74) is positioned near the first end plate (14), and the second end rod (76) is positioned near the second plate (16) of the rotisserie basket (4), and each provide a small gap therebetween, preventing food from falling through. Centrally located on the gate (66) is a central rod (80). The central rod (80)is attached to the second plurality of longitudinal rods (78) and is in a parallel relationship with the fist end rod (74) and the second end rod (76). The central rod (80) has a first end (85) and a second end (87). The first end (85) of the central rod (80) terminates prior to the hinge rod (68) on the rotisserie basket (4). The second end (87)of the central rod (80) has a U shaped portion (88) having 'shape that allows the latch rod (70) to securely sit therein. When the gate (66) is pivotably closed, the second end (75) of the first end rod (74) and the second end (79) of the second end rod (76) bear against the latch rod (70). The central rod (80) has it's U shaped portion (88) forced under the latch rod (70), allowing the latch rod (70) to securely sit within the U shaped portion (88) of the central rod (80), thereby securely closing and fastening the gate (66) to the rotisserie basket (4). A leaf spring (90) has a first end (92) and a second end (94) where the first end (92) of the leaf spring (90) is secured to the first end rod (74), and the second end (94) of the leaf spring (90) is secured to the second end rod (76). The leaf spring (90) has a concave shape (96), where the concave shape (96) has an apex (98) facing the cavity of the rotisserie basket (4) when the gate(66) is closed. When the gate (66) is secured, the leaf spring (90) bears against food positioned within the rotisserie basket (4) and prevents any undesired movement of the food.

Figure 6:
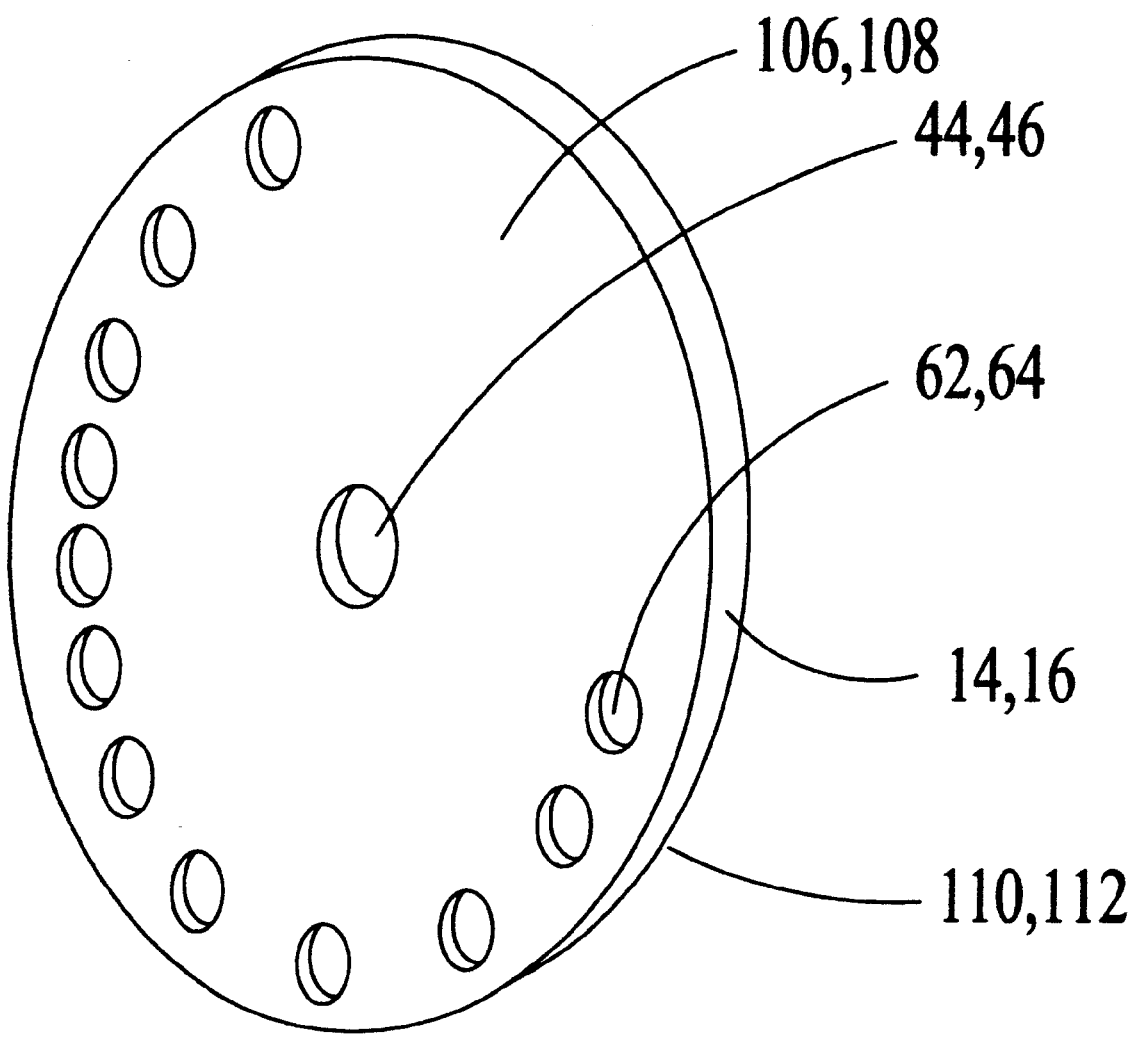
FIG. 6 shows an end plate.
Figure 7:
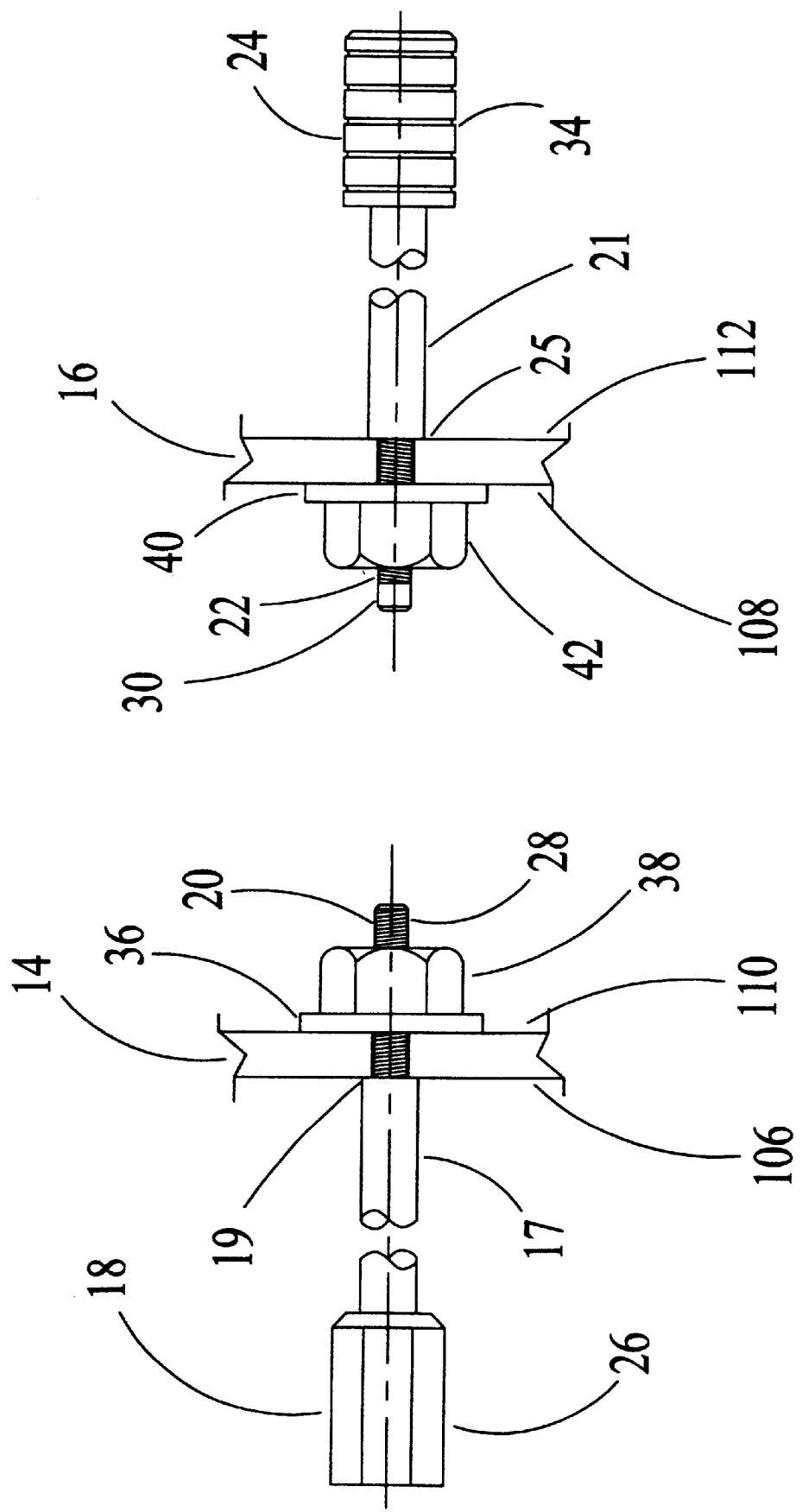
FIG. 7 shows an alternative method of attaching the axles to the end plates.

FIG. 6 shows that the first end plate (14) has a first central hole (44) defined therein, and the second end plate (16) has a second central hole (46) defined therein. The first central hole (44) and the second central hole (46) are positioned co-incident with the common longitudinal axis (47).

A first axle (17) of the rotisserie basket (4) has a first end (18) and a second opposing end (20). The first end (18) of the first axle (17) of the rotisserie basket (4) has a multi-cornered shape (26), and is positioned in the first oblong shaped positioning slot (10) of the portable grill (2). The opposing second end (20) of the first axle (17) has a shoulder (19) defined thereon. Protruding past the shoulder (19) is a threaded end (28). The threaded end (28) of the first axle (17) is inserted through the first central hole (44) of the first end plate (14) allowing the shoulder (19) to bear against the first side (106) of the first end plate (14) of the rotisserie basket (4). A common washer (36) and locknut (38) are threadably engaged onto the threaded end (28) of the first axle (17), securely fastening the first axle (17) to the first end plate (14) of the rotisserie basket (4).

A second axle (21) of the rotisserie basket (4) has a first end (22) and a second opposing end (24). The first end (22) of the second axle (21) of the rotisserie basket (4) has a second shoulder (25) defined thereon. Protruding past the second shoulder (25) is a second threaded end (30). The second threaded end (30) of the second axle (21) is inserted through the second central hole (46) of the second end plate (16) allowing the shoulder (25) to bear against the fourth side (112) of the second end plate (16) of the rotisserie basket (4). A common washer (40) and locknut (42) are threadably engaged onto the second threaded end (30) of the second axle (21), securely fastening the second axle (21) to the second end plate (16) of the rotisserie basket (4). The second axle (21) has a second end (24) opposing the first end (22). The second axle (21) may have a round shape, or a multi cornered shape similar to the first axle (17). The second end (24) of the second axle (21) has a handle (34) inserted thereon. The handle (34) may be attached by a variety of methods to include, but not limited to, press fit, and threadable engagement. The second axle (21) is positioned in the second oblong shaped positioning slot (12) of the portable grill (4).

A grill drive (not shown) may be attached to the multi-cornered end (26) of the first axle (17) of the rotisserie basket (4) thereby providing a rotational motion to the basket, allowing the food to be evenly cooked over a heat source.

Figure 2:
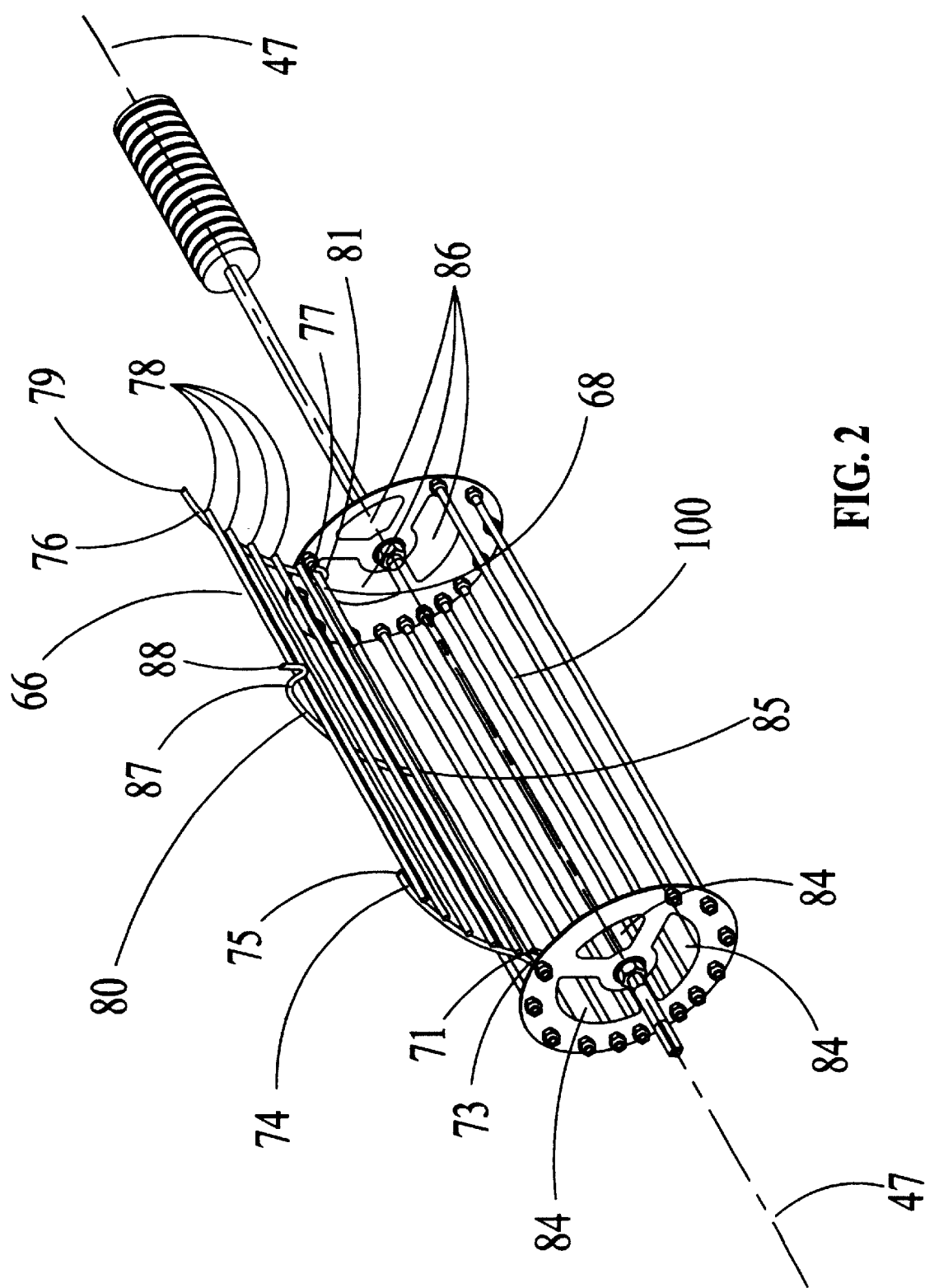
FIG. 2 shows a perspective view of the rotisserie with the cage (or door) open.

FIG. 2 shows an alternate configuration of the rotisserie basket which provides that the first end plate (14) of the rotisserie basket (4) has a first set of air vents (84) defined therein, and the second end plate (16) of the rotisserie basket (4) has a second set of air vents (86) defined therein, the air vents (84, 86) allowing hot air to vent over the food being cooked, for more even cooking of the food.

Figure 3:
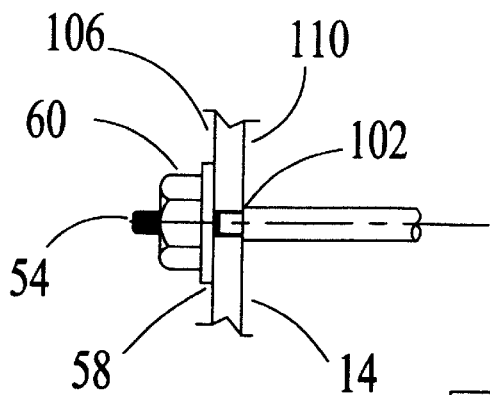
FIG. 3 shows one method of attaching the plurality of rods attached to the end plates.
Figure 3:
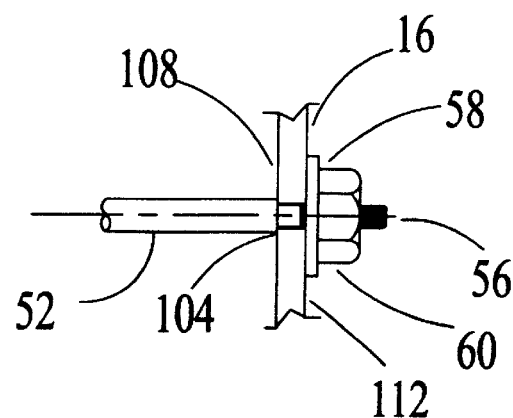

FIG. 3 shows an alternative configuration of attaching the first plurality of longitudinal rods (52) to the first end plate (14) and the second end plate (16). A first shoulder (102) bears against the first end plate (14), while a washer (58) is inserted over the first threaded end (54) of the plurality of longitudinal rods (52) and bears against the first end plate (14). A locking nut (60) threadably engages the first threaded end (54) and securely attaches the longitudinal rods (52) to the first end plate (14). A second shoulder (104) bears against the second end plate (16), while a washer (58) is inserted over the second threaded end (56) of the plurality of longitudinal rods (52) and bears against the second end plate (16). A locking nut (60) threadably engages the second threaded end (56) and securely attaches the longitudinal rods (52) to the second end plate (16).

Figure 5:
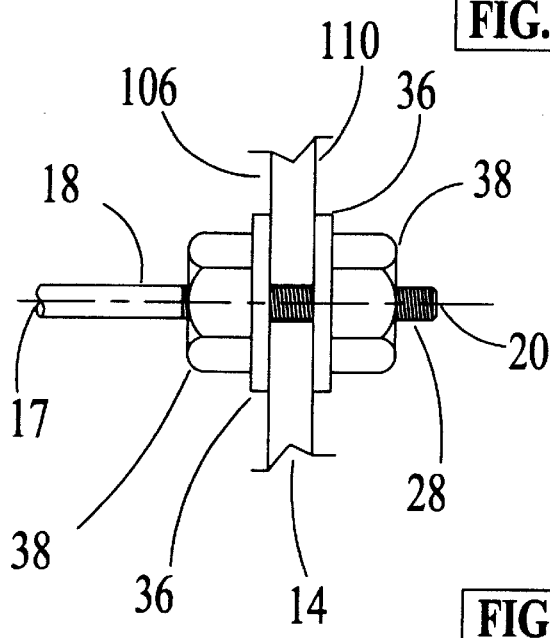
FIG. 5 shows one method of attaching the $1^{st}$ and $2^{nd}$ axles to the end plates.
Figure 5:
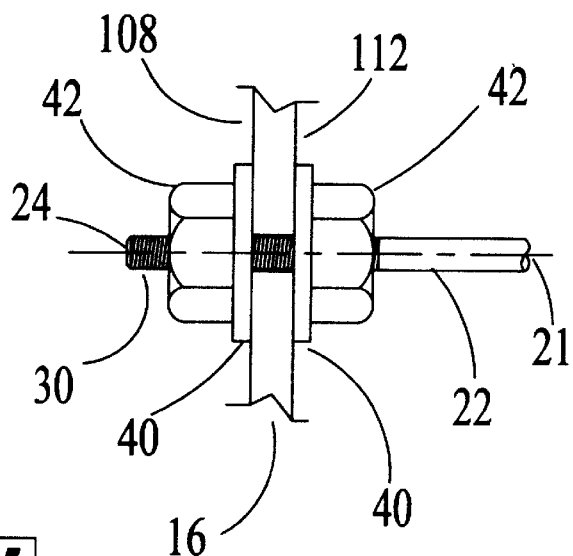

FIG. 5 shows a configuration to mount the first axle (17) and the second axle (20). The shoulder (19) on the first axle (17) is made from a common washer (36) and locknut (38) where the locknut would be threadably engaged onto the threaded end (28) of the first axle (17). The common washer (36) would then bear against the first outer surface (23) of the end plate (6). An additional common washer (36) and locknut (38) would be threadably engaged onto the threaded end (28) of the first axle (17). Tightening the locknuts (38) would cause the common washers (36) to bear hard against the first end plate (6) securely fastening the first axle (17) to the rotisserie basket (4) in a standard double nut configuration. In similar fashion, the second shoulder (25) of the second axle (21) would also be comprised of a common washer (36) and a locknut (38), wherein tightening the locknuts (38) would cause the common washers (36) to bear hard against the second end plate (16) securely fastening the second axle (21) to the rotisserie basket (4) in a standard double nut configuration.

Another method of attaching the first plurality of rods (52) to the first end plate (14), and the second end plate (16) consists of welding each of the first plurality of rods (52) to the first and second end plate (14,16).

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A rotisserie basket for a grill, comprising:

a) a first end plate having a central hole defined therein, and a second end plate having a central hole defined therein, said first end plate and said second end plate being disposed in a parallel relationship, a first plurality of longitudinal rods, said first plurality of longitudinal rods having means to be circumferentially attached to said first end plate and said second end plate, said first plurality of longitudinal rods having a length sufficient to create a holding cavity between said first and second end plates, a hinge rod and a latch rod, said hinge rod and said latch rod being disposed in a parallel relationship to each other and being attached to said first end plate and said second end plate, said hinge rod and said latch rod being circumferentially spaced to provide a longitudinal opening therebetween;

b) a first axle with a first end and a second end, said second end of said first axle being inserted through said central hole in said first end plate end and having means to attach to said first end plate, said second end having a multi cornered shape to provide a means to attach a grill drive thereon.

c) a second axle with a first end and a second end, said first end of said second axle being inserted through said central hole in said second end plate end and having means to attach to said second end plate, with said second end of said second axle attached to a handle;

d) a gate, said gate having a second plurality of longitudinal rods, a first end rod, a second end rod and a central rod, said second plurality of rods being disposed along a common longitudinal axis of said rotisserie basket with means to attach said rods to said first end rod, said second end rod and said central rod with said first end rod, said second end rod and said central rod being perpendicularly disposed to said common longitudinal axis, said first end rod having a first end and a second end, said first end of said first end rod having a loop shaped portion which hingeably pivots around said hinge rod of said rotisserie basket, said second end of said first end rod bearing against said latch rod of said rotisserie basket when said gate is in a closed position, said second end rod having a first end and a second end, said first end of said second end rod having a loop shaped portion, similar to said first end rod, which hingeably pivots around said hinge rod of said rotisserie basket, said second end of said second end rod bearing against said latch rod of said rotisserie basket when said gate is in a closed position, said central rod of said gate having a first end and a second end, said first end of said central rod terminating prior to said hinge rod and said second end of said central rod having a U-shaped portion that allows said latch rod to securely sit therein when said gate is in a closed position; and e) a leaf spring, said leaf spring having a first end and a second end, said first end of said leaf spring being secured to said first end rod of said gate and said second end of said leaf spring being secured to said second end rod of said gate, said leaf spring having a concave shape with an apex of said leaf spring facing said holding cavity in said rotisserie basket.

2. The rotisserie basket as described in claim 1, wherein said means to attach said first plurality of said longitudinal rods to said first end plate and said second end plate consists of each of said first plurality of longitudinal rods having a first threaded end, and a second threaded end, said first threaded end penetrating through each of said circumferentially positioned holes located in said first end plate and said second threaded end penetrating through each of said circumferentially positioned holes located in said second end plate, said first threaded end of said first plurality of rods is firmly attached to said first end plate using a double nut configuration, said second threaded end penetrating through each of said circumferentially positioned holes located in said second end plate and said second threaded end of said first plurality of rods is firmly attached to said second end plate using said double nut configuration to maintain said holding cavity therebetween.

3. The rotisserie basket as described in claim 1, wherein said means to attach said first plurality of longitudinal rods to said first end plate and to said second end plate consists of each of said first plurality of longitudinal rods having a first threaded end, and a second threaded end, said first threaded end penetrating through each of said circumferentially positioned holes located in said first end plate, a first shoulder of said first plurality of longitudinal rods bear against said a second side of said first end plate, a locking nut threadably engages said first threaded end and forces a washer to bear against a first side of said first end plate firmly attaching said first plurality of end rods to said first end plate, and said second threaded end penetrating through each of said circumferentially positioned holes located in said second end plate, a second shoulder of said first plurality of longitudinal rods bearing against a third side of said second end plate, a locking nut threadably engages said second threaded end and forces a washer to bear against a fourth side of said second end plate, firmly attaching said first plurality of end rods to said second end plate, maintaining said holding cavity therebetween.

4. The rotisserie basket as described in claim 1, wherein said means to attach said first axle to said first end plate consists of said second end of said first axle penetrating said central hole of said first end plate, said first axle being attached to said first end plate using a standard double nut configuration; and said means to attach said second axle to said second end plate consists of said second end of said second axle penetrating said central hole of said second end plate, said second axle being attached to said second end plate using a standard double nut configuration.

5. The rotisserie basket as described in claim 1, wherein said means to attach said first axle to said first end plate consists of said first axle having a shoulder, said shoulder positioned opposite said first end, a threaded end, said threaded end protruding past said shoulder on said first axle, said threaded end of said first axle is inserted through said first central hole of said first end plate, a washer and locknut are threadably engaged onto said threaded end forcing said shoulder to bear against a first outer side of said end plate securely fastening said first axle onto said first end plate; and said second axle has a second shoulder, said second shoulder being positioned opposite said first end of said second axle, a second threaded end, said second threaded end protruding past said shoulder on said second axle, said second threaded end of said second axle is inserted through said second central hole of said second end plate, a washer and a locknut are threadably engaged onto said second threaded end forcing said second shoulder to bear against a fourth side of said second end plate, securely fastening said second axle onto said second end plate.

6. The rotisserie basket as described in claim 1, wherein said first end plate has a first set of openings in it and said second end plate has a second set of openings in it to allow air to vent over food which is being cooked in said rotisserie basket.

* * * * *